No. 674,339. Patented May 14, 1901.
F. E. KENNEY.
FEED WATER HEATER.
(Application filed July 12, 1897.)
(No Model.) 3 Sheets—Sheet 1.
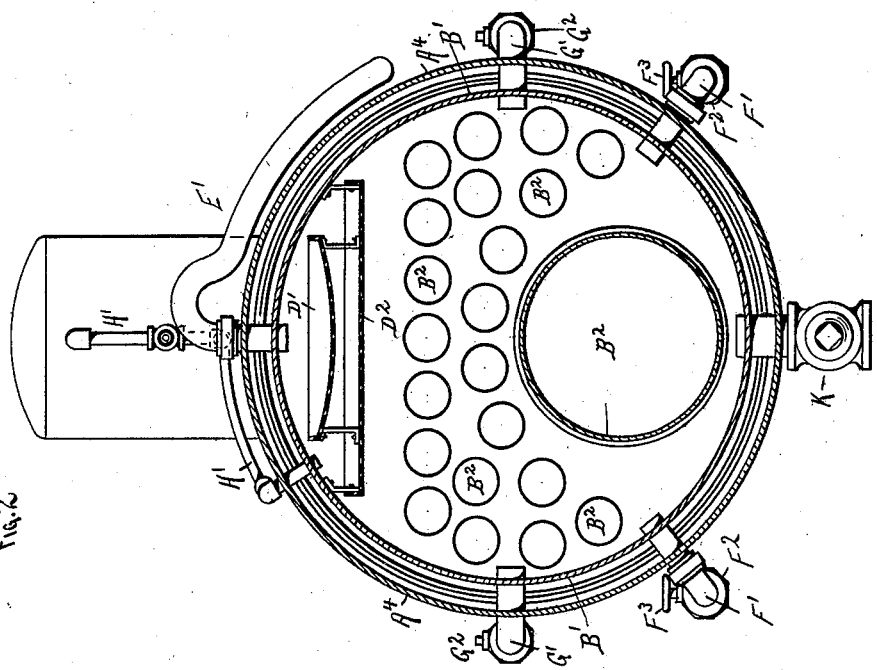
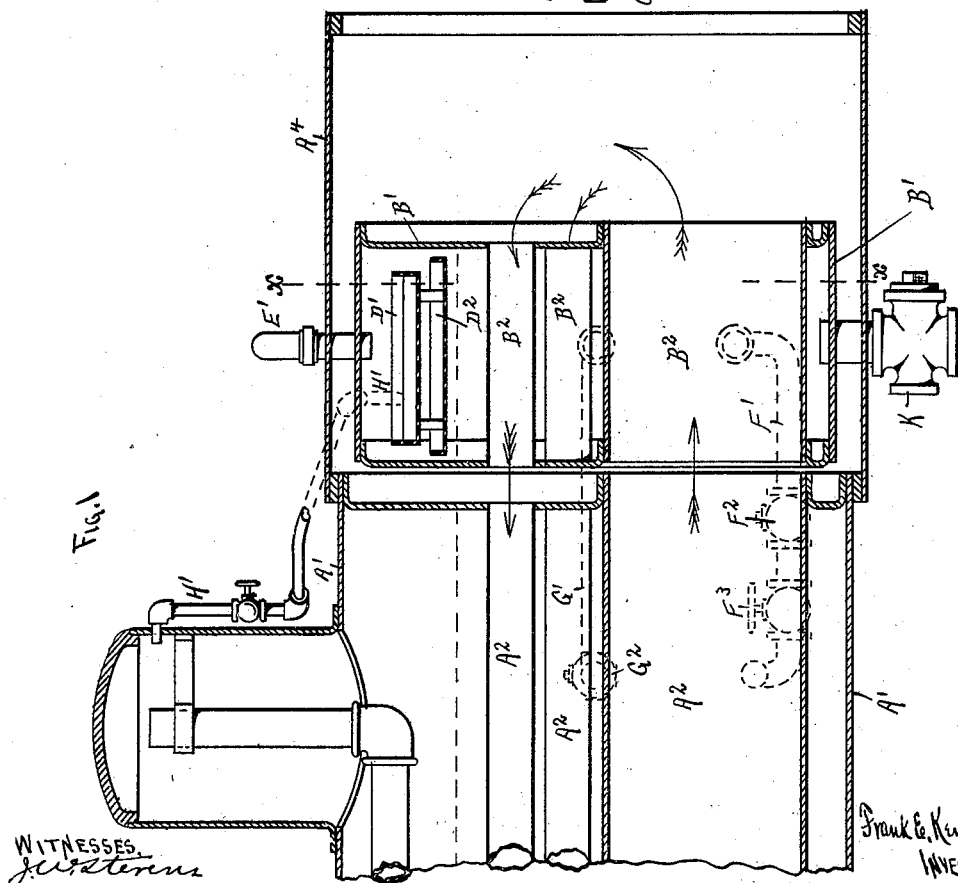

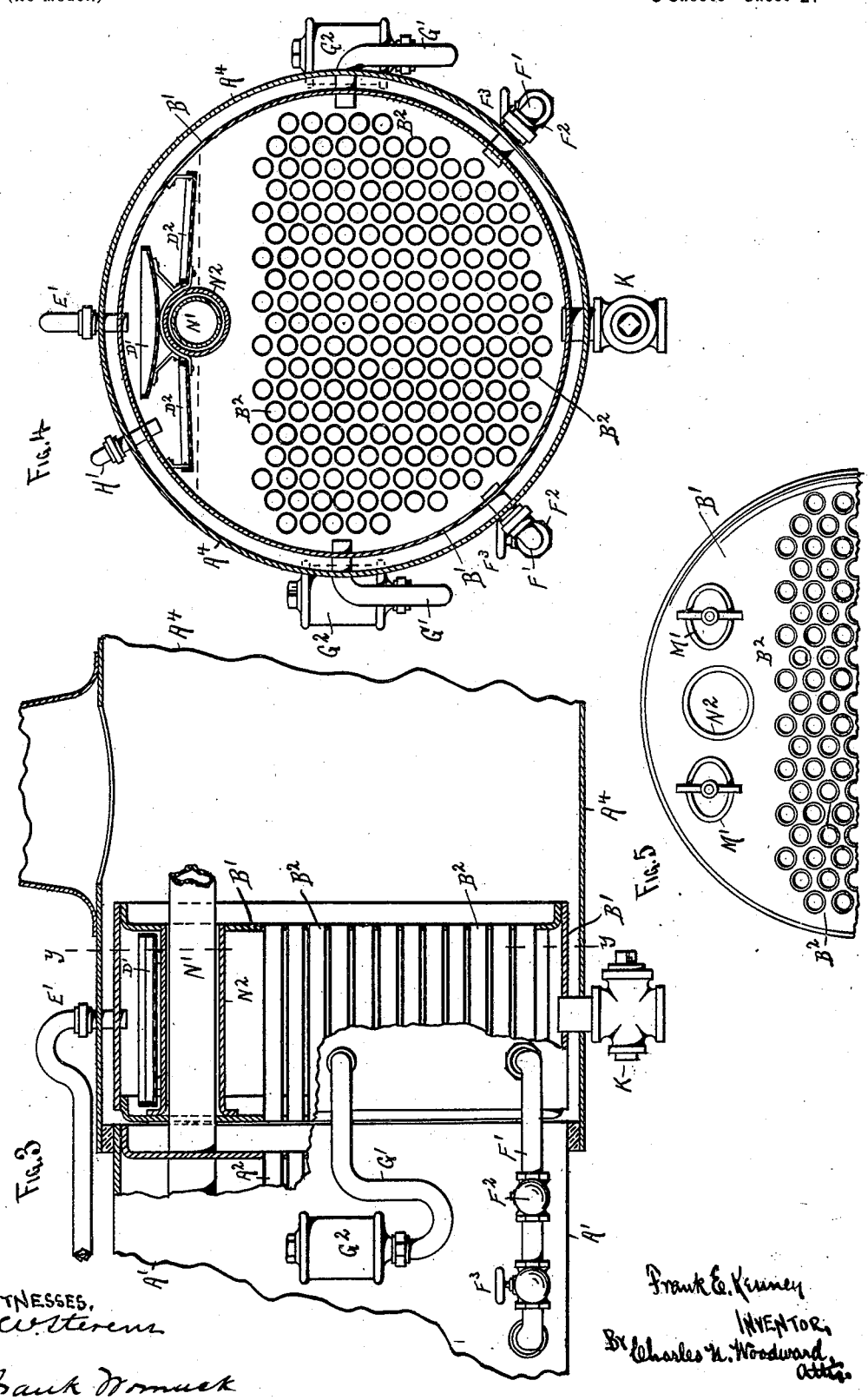

No. 674,339. Patented May 14, 1901.
F. E. KENNEY.
FEED WATER HEATER.
(Application filed July 12, 1897.)
(No Model.) 3 Sheets—Sheet 3.
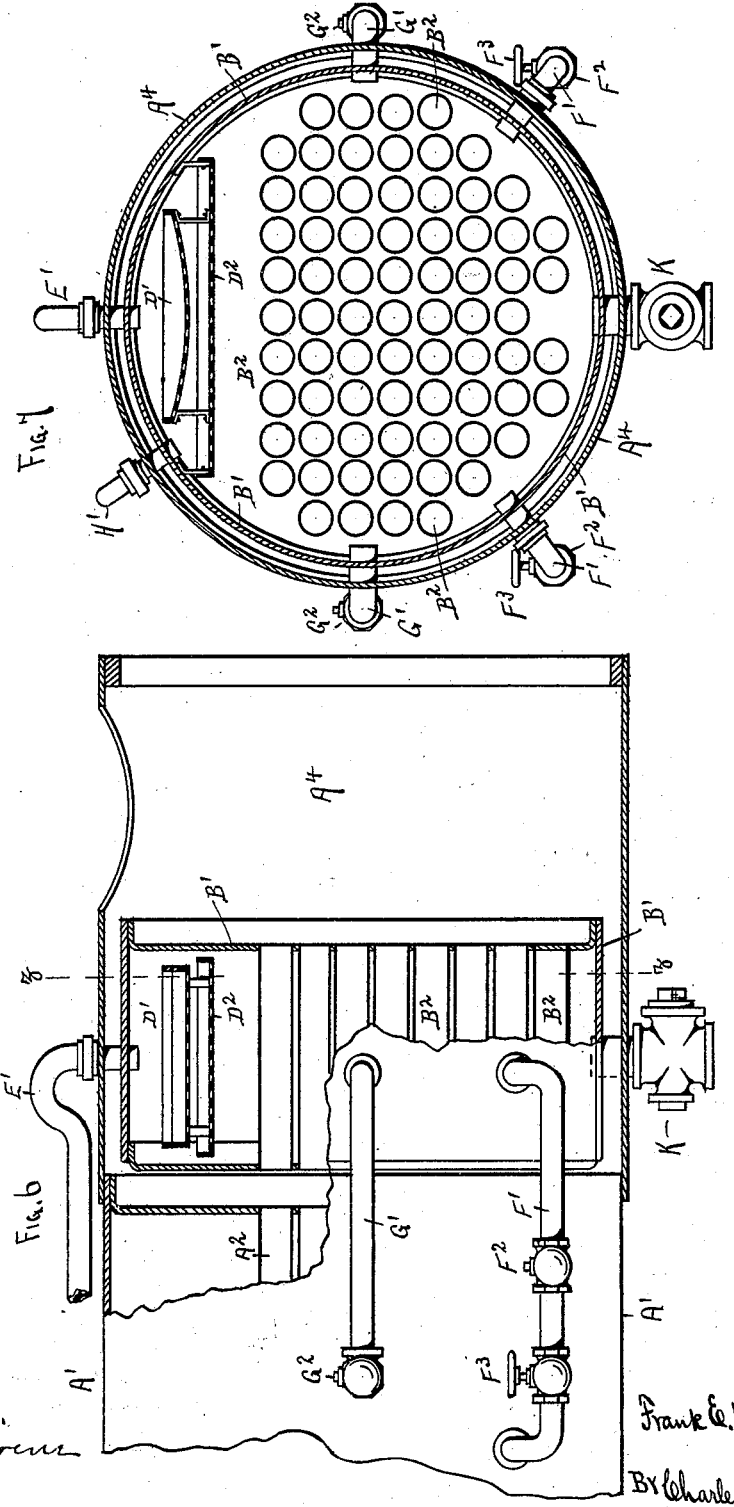

UNITED STATES PATENT OFFICE.

FRANK E. KENNEY, OF ST. PAUL, MINNESOTA, ASSIGNOR TO ELIAS CRONSTEDT AND JOHN CRONSTEDT, OF SAME PLACE.

FEED-WATER HEATER.

SPECIFICATION forming part of Letters Patent No. 674,339, dated May 14, 1901.

Application filed July 12, 1897. Serial No. 644,250. (No model.)

*To all whom it may concern:*

Be it known that I, FRANK E. KENNEY, a citizen of the United States, residing at St. Paul, in the county of Ramsey and State of Minnesota, have made certain new and useful Improvements in Feed-Water Heaters, Precipitators, and Alkali-Separators, of which the following is a specification.

This invention relates to attachments to steam-generators for the purpose of separating and precipitating the foreign and injurious substances in the feed-water and also for heating the feed-water before it enters the generator; and it consists in the construction, combination, and arrangement of parts, as hereinafter shown and described, and specifically pointed out in the claim.

In the drawings, Figure 1 is a longitudinal sectional elevation of the front end of an ordinary straw-burning threshing-machine boiler; and Fig. 2 is a cross-sectional view on the line X X of Fig. 1 with my improved heater, precipitator, and separator arranged therein. Fig. 3 is a longitudinal sectional elevation of the forward end of an ordinary locomotive-boiler; and Fig. 4 is a cross-sectional view on the line Y Y of Fig. 3, illustrating the manner of applying my improved apparatus to locomotive-boilers. Fig. 5 is a front elevation of the upper portion of the heater and precipitator-shell detached, illustrating the arrangement of the "hand-holes," through which the precipitator-pans may be reached for the purpose of cleansing them. Figs. 6 and 7 are views similar to Figs. 1 and 2, illustrating the application of the apparatus to an ordinary flue-boiler, Fig. 7 being in cross-section on the line Z Z of Fig. 6.

$A'$ represents the shell of the boiler, $A^2$ the flues, and $A^4$ the smoke-chamber, all these parts being of the usual construction, except that the smoke-chamber is longer.

The heater and precipitator consists of a shell $B'$, having flues $B^2$, corresponding to and registering with the flues of the boiler and adapted to be secured in the smoke-chamber, as shown, so that all the products of the combustion must pass through the flues of the heater on their way to the smoke-stack, and thus heat the water in the shell.

In the upper part of the shell $B'$ are arranged a series of shallow pans $D' D^2$, one above the other, so that the water will run from the upper into the next below it, and so on down through the series. In the drawings I have shown but two sets of these pans, but a greater number may be employed, if required.

$E'$ is the feed-water inlet which ends just above the center of the upper pan, so that all the feed-water must pass over the pans before it reaches the lower part of the shell.

The lower portion of the shell is connected to the main shell of the boiler by one or more equalizing-pipes $F'$, with check-valves $F^2$ opening from the boiler toward the heater, so that the water will freely flow from the boiler into the heater, and thus maintain the level of the water in the heater-shell at the same point as in the boiler.

The heater-shell $B'$ is connected to the boiler $A'$ at about its center by one or more pipes $G'$, with a check-valve $G^2$ in each opening toward the boiler, so that the water will freely flow from the heater-shell to the boiler.

$H'$ is a steam-pipe leading from the steam-dome of the boiler into the heater-shell and ending at a point near the pans $D' D^2$, so that a supply of live steam may be thrown against the water as it runs in thin streams over the edges of the pans, and thereby quickly raise the temperature of the water to cause the separation of particles of foreign and deleterious substances and cause them to be precipitated either into the pans or in the bottom of the shell $B'$, from which they can be removed by the blow-off valve K.

The front of the shell $B'$ will be supplied with hand-holes $M'$, through which the pans may be cleansed.

When used in connection with locomotives, provision must be made for the steam-pipe $N'$, which is readily done, as shown in Figs. 3, 4, and 5, by an extra flue $N^2$ in the heater-shell $B'$ for the live-steam pipe $N'$. In this construction, also, it will be necessary to divide the lower pan into two parts and arrange it upon opposite sides of the flue $N^2$, as shown; but the operation will be the same. By this simple arrangement the feed-water is first divided by the pans $D' D^2$ into thin streams or sheets, against and through which the live steam freely passes, and the water is thereby very quickly raised to a high temperature, which effectually evaporates the volatile substances and precipitates the non-volatile particles, the latter settling either into the pans D' D² or to the bottom of the shell B', leaving the purified water only to pass to the boiler through the pipes F'. The pipes F' are supplied with shut-off valves F³, so that the flow of the water from the boiler to the heater may be shut off when the heater is to be blown off through the blow-off K, which will be done when a sufficient quantity of sediment has accumulated. The amount of this accumulation will depend upon the quality of the water employed, some kinds of water containing more of the deleterious substances than others. As before stated, the pans D' D² can be readily freed from the accumulations of scale through the hand-holes M'. By this arrangement of the pipes F' G' and their check-valves F² G², together with the steam-pipe H', a perfect equalization of the pressure and a uniform water-level is maintained in the boiler and heater, so that no danger exists of any change of pressure to cause the "siphoning" of the water from the boiler into the heater or from the heater into the boiler.

The steam-pipe H' also provides for the equalization of the steam-pressure in the boiler and heater-shell.

The apparatus can be adapted to all forms of flue-boilers now in use.

Having thus described my invention, what I claim as new is—

In a feed-water heater and precipitator, a shell adapted to be set in front of the forward flue-sheet of the boiler and provided with flues corresponding to and registering with the flues of the boiler, a water-inlet pipe opening into the upper portion of the shell, a series of pans arranged below said inlet-pipe so that the water passes from the inlet-pipe to said pans and from said pans to the lower part of the shell, an inlet steam-pipe arranged adjacent to said pans and adapted to heat the water as it passes from said pans, and pipes connecting said shell and boiler to maintain a uniform water-level therein.

In testimony whereof I have hereunto set my hand in the presence of two subscribing witnesses.

FRANK E. KENNEY.

Witnesses:
FRANCIS KENNY,
JAMES NESTER.